(12) United States Patent
Baker

(10) Patent No.: US 11,943,358 B2
(45) Date of Patent: Mar. 26, 2024

(54) METHODS AND SYSTEMS FOR IDENTIFYING ANONYMIZED PARTICIPANTS OF DISTRIBUTED LEDGER-BASED NETWORKS USING ZERO-KNOWLEDGE PROOFS

(71) Applicant: EYGS LLP, London (GB)

(72) Inventor: Matthew James Baker, London (GB)

( * ) Notice: Subject to any disclaimer, the term of this patent is extended or adjusted under 35 U.S.C. 154(b) by 715 days.

(21) Appl. No.: 16/383,845

(22) Filed: Apr. 15, 2019

(65) Prior Publication Data

US 2020/0328894 A1 Oct. 15, 2020

(51) Int. Cl.
*H04L 9/00* (2022.01)
*H04L 9/32* (2006.01)
*H04L 9/40* (2022.01)
*H04L 67/10* (2022.01)

(52) U.S. Cl.
CPC .......... *H04L 9/3221* (2013.01); *H04L 9/3271* (2013.01); *H04L 67/10* (2013.01)

(58) Field of Classification Search
CPC ...... H04L 9/3221; H04L 9/3271; H04L 67/10
USPC ........................................................ 713/168
See application file for complete search history.

(56) References Cited

U.S. PATENT DOCUMENTS

| | | | |
|---|---|---|---|
| 9,397,985 B1 | 7/2016 | Seger, II et al. | |
| 9,608,829 B2 | 3/2017 | Spanos et al. | |
| 9,785,369 B1 | 10/2017 | Ateniese et al. | |
| 9,794,074 B2 | 10/2017 | Toll et al. | |
| 9,870,508 B1 | 1/2018 | Hodgson et al. | |
| 9,881,176 B2 | 1/2018 | Goldfarb et al. | |
| 9,906,513 B2 | 2/2018 | Wuehler | |
| 9,942,231 B1 | 4/2018 | Laucius et al. | |
| 9,948,467 B2 | 4/2018 | King | |
| 9,959,065 B2 | 5/2018 | Ateniese et al. | |
| 10,026,118 B2 | 7/2018 | Castinado et al. | |
| 10,298,395 B1* | 5/2019 | Schiatti | H04L 9/3218 |
| 10,825,295 B2* | 11/2020 | Simons | G07F 17/3241 |
| 10,833,861 B2* | 11/2020 | Chari | H04L 9/3218 |
| 10,951,409 B2 | 3/2021 | Konda et al. | |

(Continued)

FOREIGN PATENT DOCUMENTS

| | | |
|---|---|---|
| CN | 107274184 A | 10/2017 |
| CN | 106598824 B | 11/2018 |

(Continued)

OTHER PUBLICATIONS

DL-BAC: Distributed Ledger Based Access Control for Web ApplicationsLei Xu; ; ACM:2017; pp. 1445-1450.*

(Continued)

*Primary Examiner* — Monjur Rahim
(74) *Attorney, Agent, or Firm* — COOLEY LLP

(57) ABSTRACT

One or more embodiments described herein disclose methods and systems that are directed at providing enhanced privacy and security to distributed ledger-based networks (DLNs) via the implementation of zero-knowledge proofs (ZKPs) in the DLNs. ZKPs allow participants of DLNs to prove ownership of accounts on the DLNs without having to necessarily reveal private information such as the private key of the account publicly. As such, the disclosed methods and systems directed at the ZKP-enabled DLNs provide privacy to participants of the DLNs while still allowing the DLNs to remain as consensus-based networks.

28 Claims, 2 Drawing Sheets

(56) References Cited

U.S. PATENT DOCUMENTS

| | | | |
|---|---|---|---|
| 11,146,399 | B2 | 10/2021 | Westland et al. |
| 11,194,837 | B2 | 12/2021 | Vo |
| 11,502,838 | B2 | 11/2022 | Connor |
| 11,582,043 | B2 | 2/2023 | Glickshtein |
| 11,677,563 | B2 | 6/2023 | Glickshtein |
| 11,683,175 | B2 | 6/2023 | Connor |
| 11,683,176 | B2 | 6/2023 | Connor |
| 11,777,734 | B2 | 10/2023 | Connor |
| 11,811,946 | B2 | 11/2023 | Glickshtein |
| 2014/0279384 | A1 | 9/2014 | Loevenich |
| 2016/0260169 | A1 | 9/2016 | Arnold et al. |
| 2016/0358165 | A1 | 12/2016 | Maxwell |
| 2017/0091750 | A1 | 3/2017 | Maim |
| 2017/0161829 | A1* | 6/2017 | Mazier ............... G06Q 40/06 |
| 2017/0163733 | A1 | 6/2017 | Grefen et al. |
| 2017/0243212 | A1 | 8/2017 | Castinado |
| 2017/0278100 | A1 | 9/2017 | Kraemer et al. |
| 2017/0293503 | A1 | 10/2017 | Curtis |
| 2017/0346639 | A1 | 11/2017 | Muftic |
| 2018/0048461 | A1 | 2/2018 | Jutla et al. |
| 2018/0077122 | A1* | 3/2018 | Hoss ............... G06F 21/6254 |
| 2018/0101701 | A1 | 4/2018 | Barinov et al. |
| 2018/0139043 | A1 | 5/2018 | Jayachandran et al. |
| 2018/0165131 | A1 | 6/2018 | O'Hare et al. |
| 2018/0189753 | A1 | 7/2018 | Konda et al. |
| 2018/0218176 | A1 | 8/2018 | Voorhees et al. |
| 2018/0219669 | A1 | 8/2018 | Chen et al. |
| 2018/0285217 | A1* | 10/2018 | Smith ............... G06F 21/00 |
| 2018/0294967 | A1 | 10/2018 | Roberts et al. |
| 2018/0343114 | A1* | 11/2018 | Ben-Ari ............... H04L 9/06 |
| 2019/0012660 | A1 | 1/2019 | Masters |
| 2019/0012662 | A1 | 1/2019 | Krellenstein et al. |
| 2019/0019180 | A1 | 1/2019 | Coburn et al. |
| 2019/0034923 | A1* | 1/2019 | Greco ............... G06Q 20/383 |
| 2019/0138621 | A1 | 5/2019 | Tobias |
| 2019/0158275 | A1* | 5/2019 | Beck ............... G06F 16/2379 |
| 2019/0164153 | A1* | 5/2019 | Agrawal ............... H04L 9/008 |
| 2019/0165943 | A1* | 5/2019 | Chari ............... H04L 9/30 |
| 2019/0173854 | A1* | 6/2019 | Beck ............... H04L 9/3239 |
| 2019/0190701 | A1* | 6/2019 | Mitra ............... H04L 9/3239 |
| 2019/0236559 | A1 | 8/2019 | Padmanabhan |
| 2019/0236594 | A1 | 8/2019 | Ehrlich-Quinn |
| 2019/0238525 | A1 | 8/2019 | Padmanabhan et al. |
| 2019/0244290 | A1 | 8/2019 | Massacci |
| 2019/0286102 | A1 | 9/2019 | Carbone et al. |
| 2019/0299105 | A1 | 10/2019 | Knight |
| 2020/0013118 | A1* | 1/2020 | Treat ............... G06Q 20/383 |
| 2020/0059361 | A1* | 2/2020 | Konda ............... H04L 9/3218 |
| 2020/0059362 | A1 | 2/2020 | Brody et al. |
| 2020/0059364 | A1 | 2/2020 | Konda et al. |
| 2020/0067907 | A1* | 2/2020 | Avetisov ............... H04L 9/0825 |
| 2020/0074518 | A1* | 3/2020 | Kumaraswamy ..... H04L 9/3239 |
| 2020/0076615 | A1* | 3/2020 | Redpath ............... H04L 9/3218 |
| 2020/0082411 | A1 | 3/2020 | Lacona |
| 2020/0127833 | A1 | 4/2020 | Konda et al. |
| 2020/0127834 | A1 | 4/2020 | Westland |
| 2020/0159847 | A1* | 5/2020 | Smith ............... G06F 16/27 |
| 2020/0160319 | A1* | 5/2020 | Smith ............... H04L 63/102 |
| 2020/0193425 | A1* | 6/2020 | Ferenczi ............... H04L 63/12 |
| 2020/0193429 | A1* | 6/2020 | Babar ............... H04L 9/3239 |
| 2020/0210519 | A1 | 7/2020 | Wang et al. |
| 2020/0274712 | A1* | 8/2020 | Gray ............... H04L 9/3213 |
| 2020/0275273 | A1* | 8/2020 | Smith ............... H04W 12/35 |
| 2020/0322154 | A1 | 10/2020 | Konda et al. |
| 2020/0327100 | A1* | 10/2020 | Androulaki ............... G06Q 20/223 |
| 2020/0327112 | A1 | 10/2020 | Glickshtein |
| 2020/0328890 | A1 | 10/2020 | Connor |
| 2020/0328899 | A1 | 10/2020 | Glickshtein |
| 2021/0019849 | A1 | 1/2021 | Qian |
| 2023/0046268 | A1 | 2/2023 | Connor |
| 2023/0047830 | A1 | 2/2023 | Connor |
| 2023/0071564 | A1 | 3/2023 | Connor |
| 2023/0198774 | A1 | 6/2023 | Glickshtein |
| 2023/0216689 | A1 | 7/2023 | Glickshtein |

FOREIGN PATENT DOCUMENTS

| | | |
|---|---|---|
| CN | 109359948 A | 2/2019 |
| WO | WO 2017/187395 | 11/2017 |
| WO | WO 2018/007828 | 1/2018 |
| WO | WO 2018/028777 | 2/2018 |
| WO | WO 2018/144302 | 8/2018 |

OTHER PUBLICATIONS

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7... ], Retrieved on Aug. 27, 2018, 11 pages.

Parno, B. et al., "Pinocchio: Nearly practical verifiable computation," S&P (2013).

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Ben-Sasson, E. et al., "Scalable, transparent, and post-quantum secure computational integrity," Cryptology ePrint Archive, Report 2018/046 (2018).

Wu, H., "DIZK: Distributed zero-knowledge proof systems," In USENIX Security (2018).

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

International Search Report and Written Opinion for International Application No. PCT/US2019/046532, dated Dec. 2, 2019, 9 pages.

International Search Report and Written Opinion for International Application No. PCT/US2019/046808, dated Dec. 2, 2019, 10 pages.

Kosba, A. et al., "Hawk: The Blockchain Model of Cryptography and Privacy-Preserving Smart Contracts," 2016 IEEE Symposium on Security and Privacy, May 2016, pp. 839-858.

Office Action for U.S. Appl. No. 16/283,452, dated Nov. 6, 2019, 34 pages.

Office Action for U.S. Appl. No. 16/283,452, dated Jul. 10, 2019, 31 pages.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

International Search Report and Written Opinion for International Application No. PCT/EP2020/060629, dated Jun. 25, 2020, 9 pages.

International Search Report and Written Opinion for International Application No. PCT/US2019/057246, dated Feb. 4, 2020, 8 pages.

Office Action for U.S. Appl. No. 16/659,335, dated Apr. 23, 2020, 12 pages.

Office Action for U.S. Appl. No. 16/659,335, dated Aug. 13, 2020, 15 pages.

International Search Report and Written Opinion for International Application No. PCT/US2019/057262, dated Jan. 24, 2020, 9 pages.

International Search Report and Written Opinion for International Application No. PCT/EP2020/060610, dated Jul. 27, 2020, 17 pages.

Invitation to Pay Additional Fees and Partial International Search Report for International Application No. PCT/EP2020/060623, dated Jun. 17, 2020, 12 pages.

International Search Report and Written Opinion for International Application No. PCT/EP2020/060623, dated Aug. 7, 2020, 16 pages.

Bunz, B. et al., "Zether: Towards privacy in a smart contract world," IACR, International Association for Cryptologic Research, vol.

(56) References Cited

OTHER PUBLICATIONS

20190226:031535, Feb. 20, 2019, Retrieved from the Internet: <URL:http://eprint.iacr.org/2019/191.pdf>, Retrieved on Feb. 20, 2019, 49 pages.

Clifton, M., "Understanding Merkle Trees—Why use them, who uses them, and how to use them," [Online], www.codeproject.com, pp. 1-31 (2017).

Dinh, T. T. A. et al., "Blockbench: A framework for analyzing private blockchains," [Online], Retrieved from the Internet: <URL: https://arxiv.org/abs/1703.04057>arXiv:1703.04057v1, Mar. 12, 2017, 16 pages.

Khalil, R. et al., "NOCUST—A securely scalable commit-chain," Feb. 15, 2019, Retrieved from the Internet: <URL:https://eprint.iacr.org/eprint-bin/getfile.plentry=2018/642&version=20190215:182502&file=642.pdf>, Retrieved on Mar. 10, 2020, 27 pages.

Lee, C. H. et al., "Implementation of IoT system using blockchain with authentication and data protection," 2018 International Conference on Information Networking (ICOIN), IEEE, Jan. 10, 2018, pp. 936-940.

Menezes, A. et al., "Key Management Techniques," Chapter 13 in Handbook of Applied Cryptography, CRC Press, Boca Raton, FL, (1996), pp. 543-590.

Jiang, Y. et al., "A privacy-preserving e-commerce system based on the blockchain technology," 2019 IEEE International Workshop on Blockchain Oriented Software Engineering (IWBOSE 2019), Hangzhou, China, Feb. 2019, pp. 50-55.

International Search Report and Written Opinion for International Application No. PCT/EP2020/060626, dated Sep. 3, 2020, 12 pages.

Magazzeni, D. et al., "Validation and verification of smart contracts: A research agenda," Computer, vol. 50, No. 9, Sep. 2017, pp. 50-57.

Office Action for U.S. Appl. No. 16/534,858, dated Jun. 23, 2021, 11 pages.

Final Rejection Office Action for U.S. Appl. No. 16/542,701 dated Oct. 6, 2022, 28 pages.

Trufflesuite | Ganache, retrieved online on Sep. 22, 2022, https://github.com/trufflesuite/ganache/commit/332be605c13.

Examiners Answer to Appeal Brief in U.S. Appl. No. 16/542,701, mailed Jun. 14, 2023, 27 pages.

Non-Final Office Action for U.S. Appl. No. 18/109,017, dated May 2, 2023, 5 pages.

Non-Final Office Action for U.S. Appl. No. 18/170,844, dated Jun. 14, 2023, 9 pages.

\* cited by examiner

METHODS AND SYSTEMS FOR IDENTIFYING ANONYMIZED PARTICIPANTS OF DISTRIBUTED LEDGER-BASED NETWORKS USING ZERO-KNOWLEDGE PROOFS

FIELD OF THE DISCLOSURE

Distributed ledger-based networks (DLNs) facilitate the anonymization of participants of the networks, complicating efforts to identify ownership of accounts on the DLNS, which may be needed, for example, for business, legal, financial, law enforcement, etc., reasons. Both participants whose accounts are being audited and participants who are performing the audit may wish to complete the audit process without violating the privacy, safety and security of the auditee. The disclosure discloses methods and systems that are directed at facilitating identification of anonymized account owners on DLNs with the use of zero-knowledge proof (ZKP) techniques.

BACKGROUND

Organizations can use private networks as well as public networks such as distributed ledger-based networks (DLNs) to conduct organizational activities, which may include maintaining private accounts on the DLNs. An auditor may audit the ownership of a DLN account by engaging the purported account owner to prove ownership of the account by using cryptographic challenges that require account owner participations, having the purported account owner run test transactions and/or receiving access to the private keys of the account from the purported account owner. These options, however, may compromise the privacy and/or security of the account and its owner, besides being inefficient and costly.

SUMMARY

Figure 1:
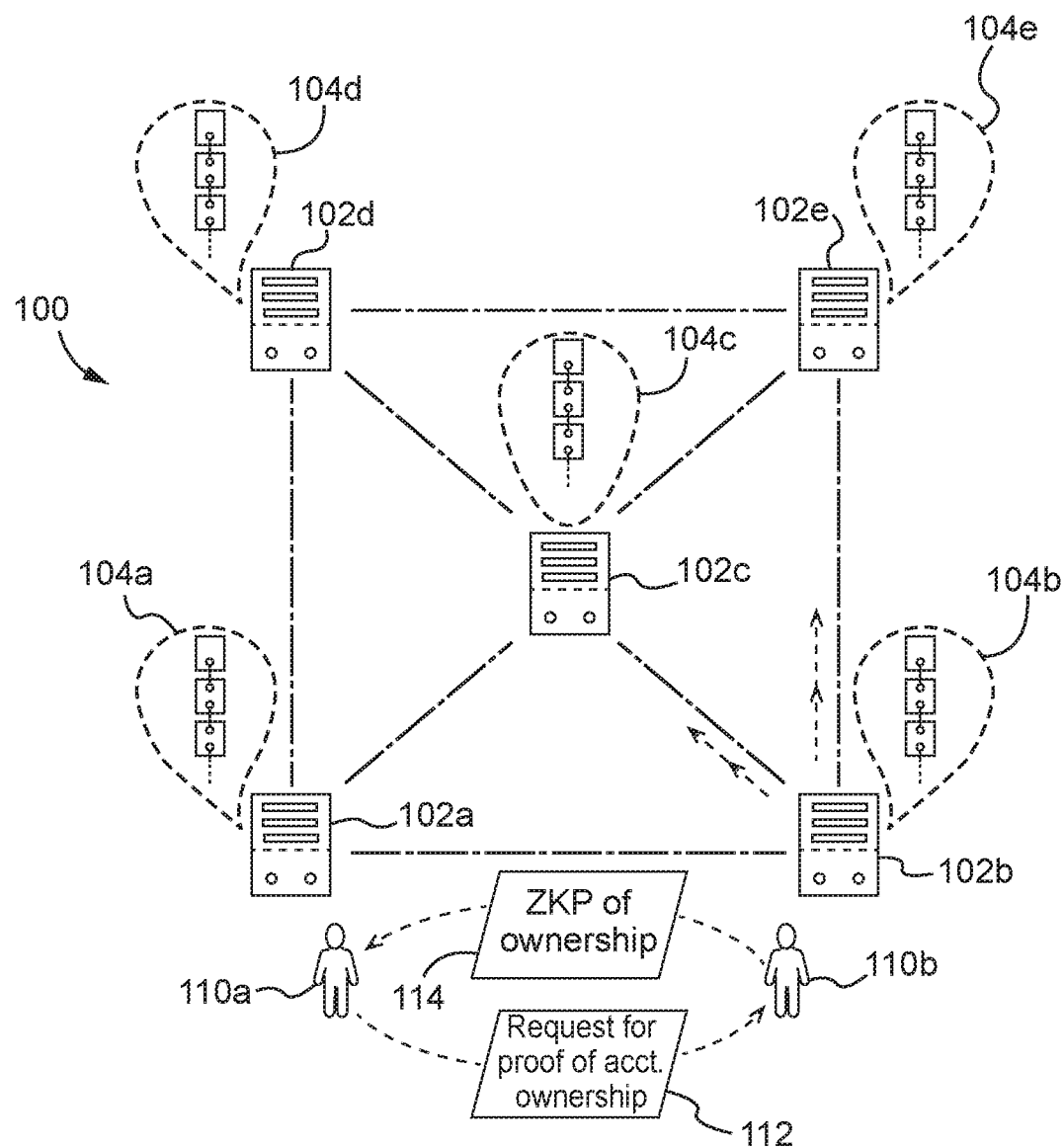
FIG. 1 shows a schematic illustrating the identification of anonymized owners of accounts on a distributed ledger-based network, according to some embodiment.

In some embodiments, methods and systems facilitate the identification of anonymized participants on distributed ledger-based networks (DLNs). For example, the methods and systems facilitate the auditing of the ownership of an account on a ZKP-enabled DLN. In such embodiments, the methods may include the steps of: sending, from a device of a sender on a network of computing nodes to a user of a distributed ledger on the network, a request for information about an access the user has to an account on the distributed ledger; receiving, in response to the request and on the distributed ledger, a ZKP that the user has access to the account and a public input for use in verifying the ZKP; causing a self-executing code segment on the distributed ledger to perform a computation of the received ZKP using the public input to verify the user has access to the account, the computation of the received ZKP occurring without any interaction between the user and the sender after the ZKP is received; and generating a confirmation verifying the user has access to the account based on a result of the computation of the ZKP.

DETAILED DESCRIPTION

In some embodiments, participants of a distributed ledger-based network (DLN) (also referred herein as a blockchain network) may use the network to conduct a variety of activities without the supervision of a central authority, such activities including but not limited to exchanging digital assets, managing the transfer of real world physical assets between the participants by using asset tokens as representations of the assets and their transfers on the DLNs, etc. For example, token commitments can be used to represent a physical off-the-blockchain asset on the DLN, and the transfer of the physical asset from a first to a second participant of the DLN can be represented on the DLN by the invalidation of the token commitment that assigned ownership of the physical asset to the first participant and the registration on the DLN of a new token commitment that assigns ownership of the physical asset to the second participant. In some embodiments, the participants may maintain one or more accounts, addresses or wallets (referred hereinafter as "accounts") on the DLN for use in sending and/or receiving token commitments as well as other tokens such as but not limited to physical asset tokens, security tokens, utility tokens, etc.

The accounts may be identified on the DLN by public addresses or public keys (of asymmetric key pairs that each includes the public key and a private key, for example) that are available to anyone with access to the DLN (or even the public at large). For instance, using the public key of an account, any other account on the DLN may be able to send tokens to the account of the public key without a prior permission from the account owner (i.e., accounts may be configured to receive tokens without prior permission from account owners). To obtain access to an account (e.g., to be able to send tokens from an account to other accounts on the DLN), however, one may need to be in possession of the private key of the asymmetric pair to which the public key of the account belongs. Owing to the decentralized nature of the DLN, in some implementations, the sending and/or receiving of tokens may be accomplished without the management of a central authority.

In some embodiments, a self-executing code or program (e.g., a smart contract) may be used to manage transactions between DLN participants on the DLN. In particular, smart contracts may be used to facilitate transactions that depend on the fulfillment of certain conditions for the transaction to be consummated. For example, parties participating in a transaction for a sale of a digital music file can use a smart contract on the DLN to manage the sale of the music file. The self-executing code or smart contract can regulate the exchange of the music file and the correct payment for the file between the parties without involvement from a third party (e.g., central authority). For instance, the smart contract may allow the payment to be disbursed after the delivery of the music file is verified. Throughout the instant disclosure, in some embodiments, the terms "self-executing code" or "self-executing code segment" and "smart contract" may be used interchangeably. Similarly, in some embodiments, the terms "distributed ledger-based network" and "blockchain network" may be used interchangeably.

As noted above, in some embodiments, the trust that DLNs provide with no need for a central authority derives from the decentralized nature of the networks as well as the transparency of the networks to at least all the participants of the networks (and in the case of public networks, to the public at large). In some implementations, multiple computing nodes may make up a DLN, and actions undertaken on the DLN, such as transactions between participants of the DLN, can be recorded on all or nearly all ledgers that are stored on the multiple computing nodes after at least a substantial number of the computing nodes (or their owners) agree on the validity of the transactions. The distributed ledgers can be immutable or nearly immutable in the sense that to alter the distributed ledgers, at least a substantial portion of the computing nodes would have to agree, which can be increasingly difficult when the number of computing nodes is large (and the distributed ledger gets longer).

In some implementations, the trust in DLNs, engendered at least partly due to the decentralization thereof, may be augmented with the transparency of the DLNs. For example, DLNs allow any interested person with access to the DLNs to inspect the distributed ledgers on the networks to obtain detailed information on all transactions that are recorded on the ledgers since the inception of the DLNs (e.g., as the ledgers are, as discussed above, largely immutable in at least most cases). In some implementations, the detailed information may not include the identity of the entity or person that owns or has access to an account on the DLNs (e.g., whether the account was involved in a transaction or not). For example, an account may be identified by a public address or a public key, and the identity of the entity or person that has access to the account via a private key may not be apparent from the information gleaned from the distributed ledgers. Throughout the instant disclosure, in some embodiments, "ownership of an account" may refer to having access to or possession of the private key of the account, which may or may not include legal ownership of the account.

In some embodiments, it may be desirable for the ownership of DLN accounts to be verified by an auditor, who may be one of the participants of the DLN. For example, a person or a business entity may claim that they own an account, and an auditor may be tasked with verifying the ownership of the account for variety of legal and/or business reasons. An "auditor" herein refers to a participant of a DLN that is attempting to confirm the ownership of an account on the DLN, examples of such "auditors" including financial, legal or business auditors, members of law enforcement agencies, etc.

An auditor may employ a variety of techniques to verify the ownership of an account on the DLN. For example, the auditor may request for the private key from the auditee. As another example, the auditor may request that the auditee engage in a test transaction from the account that is being audited or respond to a cryptographic challenge as a demonstration or proof of ownership of the account. One or more of these techniques, however, may be undesirable or impractical to implement in DLNs as ways of performing audits of DLN accounts.

If an auditor receives a private key from a person or entity purporting to be the owner of an account, the auditor may check to see if the private key provides the auditor access to the account, and if true, may confirm that the person or entity is in fact the owner of the DLN account. An auditee, however, may not be willing to share private keys of accounts on DLNs for security reasons, in particular in view of increased cyber threats (e.g., due to company policy, auditee's insurance or other contractual conditions and warranties, etc.). Further, the auditor may not be willing or able to assume the liability that comes from possessing a private key to somebody else's account.

An auditor may also consider a test transaction conducted from an account on the DLN by a person or entity purporting to be the owner of the account to be a satisfactory demonstration of ownership of the account. For example, the test transaction may be in the form of a small amount of tokens transferred from the account being audited to an account of the auditor, and the execution of the transaction in the manner (e.g., the amount of the tokens, the timing of the transfer, etc.) as stipulated beforehand by the auditor and the person or entity may be deemed as a satisfactory evidence that the person or entity in fact owns the account (e.g., has access to or ownership of the private key of the account).

The auditor may also pose a cryptographic challenge to the purported owner, and if the challenge is met with success, then the auditor may confirm the purported owner as the real owner whose account is being audited. For example, the cryptographic challenge may be created using the public key of the account on the DLN, and may be designed to be solved only with the use of the private key of the same account (i.e., the private key of the asymmetric key pair of the account). If the purported owner manages to solve the challenge, then that may be considered as a proof that the purported owner has the private key in his/her possession (and as such, owns the account).

Requesting a test transaction from purported owners and/or presenting purported owners with cryptographic challenges to prove ownership of an account on the DLN may not, however, be desirable or practical for several reasons. First, both techniques, being interactive, would require a response from the auditee, who may not be able to, or be willing to, engage in the auditing process. Further, the techniques may increase the cost of the audits. For example, either the auditor and/or the auditee would have to absorb the transaction fee that may be generated when a test transaction is made on the DLN.

Accordingly, one or more of the embodiments disclosed herein disclose methods and systems that facilitate the auditing of ownership of accounts on DLNs without a necessary input or response from the purported owners of the accounts during the audit process. Further, the methods and systems may also allow the audits to be completed without the security and privacy of the owners and their account being compromised during the audit processes (e.g., without the private keys of the accounts being exposed on the DLN or publicly, without the identity of the owners being exposed on the DLN or to the public (except the auditor, in some cases), etc.). One or more of the disclosed embodiments provide enhanced security, privacy and convenience to the account audit process in the DLNs via the implementation of ZKPs in the DLNs.

FIG. 1 shows a schematic of an audit of the ownership of an account on a ZKP-enabled DLN, according to some embodiment. In some embodiments, the ZKP-enabled DLN or blockchain network 100 includes multiple computing nodes 102a-102e configured to communicate amongst each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. In some implementations, the P2P connections may be provided by wired and/or wireless communications systems or networks (not shown) such as but not limited to the internet, intranet, local area networks (LANs), wide area networks (WANs), etc., utilizing wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between parties transacting or interacting on the ZKP-enabled DLN 100 (e.g., an auditor and an auditee). For example, some or all of the computing nodes 102a-102e may include copies of a self-executing code that self-execute upon fulfillment of the conditions. In some implementations, the computing nodes 102a-102e may communicate amongst each other with the results of the executions of their respective self-executing codes, for example, to arrive at a consensus on the results. In some implementations, one or a few of the computing nodes 102a-102e may have self-executing codes that self-execute, and the results would be transmitted to the rest of the computing nodes 102a-102e for confirmation.

In some embodiments, a self-executing code or a smart contract can facilitate the completion of transactions or interactions on the ZKP-enabled DLN 100 by providing the participating parties confidence that the other party would deliver the promised product or action. For example, a smart contract can be used to verify a proof provided by one participant (e.g., 110b) of an interaction or a transaction, allowing a second participant (e.g., 110a) to proceed with the interaction or transaction to completion. For instance, an auditee 110b, in response to a request 112 from an auditor 110a sent via a computing node 102a, may generate and provide to a smart contract residing on the ZKP-enabled DLN 100 (e.g., a smart contract residing on each or nearly each of the computing nodes 102a-102e that make up the ZKP-enabled DLN 100) a proof (e.g., a ZKP) 114 that the auditee 110b is in fact the owner of an account on the ZKP-enabled DLN 100 (e.g., the auditee owns, has access to or possesses a private key of the account). In such implementations, the smart contract may compute the proof to verify that the auditee 110b is in fact an owner of the account on the ZKP-enabled DLN 100. In some cases, the computation of the proof may occur when activated or initiated by the auditor 110a, or when a certain condition (e.g., date, time, etc.) is fulfilled.

In some embodiments, the ZKP-enabled DLN 100 may be linked to one or more oracles (not shown) or data feeds that provide external data to the ZKP-enabled DLN 100. For example, an oracle can be a hardware (e.g., computing node) or software (stored and/or executing on hardware) that is configured to gather or receive data from systems external to the ZKP-enabled DLN 100 (e.g., sensors, information sources such as the interne (via a web API, for example), etc.) and provide the collected data or information to a smart contract on the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, date, time, etc., and an oracle may provide the requisite information to the smart contract facilitating the transaction. The smart contract, upon receiving the information, may self-execute after determining that the condition for the transaction has been fulfilled. In some embodiments, the oracles may facilitate for the smart contracts to send data out to external systems. For example, a smart contract may be configured to verify a ZKP provided by an auditee at a certain date and time, and send out the verification results to an auditor's device or system when the verification is complete. In some implementations, an oracle may serve as a transit hub for the data including the verification results during its transmission to the auditor device or system.

In some embodiments, at least a substantial number of the computing nodes 102a-102e can include copies of a distributed ledger 104a-104e onto which transactions that occur on the network are recorded. The recording of the transactions on the distributed ledger 104a-104e may occur when some substantial proportion of the computing nodes 102a-102e, or a subset thereof, agree on the validity of the transactions. The distributed ledger 104a-104e can be immutable or nearly immutable in the sense that to alter the distributed ledger 104a-104e, at least this substantial portion of the computing nodes 102a-102e would have to agree, which can be increasingly difficult when the number of computing nodes 102a-102e is large (and the distributed ledger 104a-104e gets longer).

As noted above, one or more of the disclosed embodiments provide enhanced security, privacy and convenience to account audit processes in DLNs via the implementation of ZKPs in the DLNs. In some embodiments, ZKPs can be used by a first entity, the "prover" or "provider" of the proofs, to convince a second entity, the "verifier" of the proofs, that a statement about some secret information is truthful without having to reveal the secret information to the verifier. For example, the first entity can be an auditee 110b claiming to own an account on a ZKP-enabled DLN, the second entity can be an auditor 110a attempting to determine ownership of the account, the secret information can be the private key of the account the possession of which indicates ownership of the account, and the statement can be a statement stating that the auditee owns, has access to or possesses the private key. In such cases, ZKPs can be used by the auditee 110b to prove to the auditor 110a that the auditee 110b is in fact the owner of the account without having to disclose the secret information (e.g., the private key) to the auditor 110a (or anyone else on the ZKP-enabled DLN or publicly). ZKPs can be interactive, i.e., require interaction from the prover for the verifier to verify the truthfulness of the statement. In some embodiments, the ZKPs can be non-interactive, requiring no further interaction from the prover for the verifier to verify the statement. Examples of non-interactive ZKPs include zero-knowledge succinct non-interactive argument of knowledge (zk-SNARK) proof, zero-knowledge scalable transparent argument of knowledge (zk-STARK) proof, etc. Discussions related to the use of ZKPs to provide privacy to participants of ZKP-enabled DLNs interacting on the networks (e.g., using the ZKP-enabled DLNs to represent the transfer of assets between the participants) can be found in U.S. Provisional Application No. 62/719,636, filed Aug. 18, 2018, entitled "Methods and Systems of ZKP-Based Secure PE Transactions on Public Networks," and U.S. Provisional Application No. 62/748,002, filed Oct. 19, 2018, entitled "Methods and Systems of ZKP-Based Secure Private Enterprise Transactions on Public Networks," both of which are incorporated herein by reference in their entireties.

With reference to FIG. 1, in some embodiments, an auditor 110a may present a request 112 to an auditee 110b purporting to be an owner of an account on a ZKP-enabled DLN 100 for proof of ownership of the account. For example, the account may be identified on the ZKP-enabled DLN 100 with a public key that is part of an asymmetric key pair of the account, and the auditor 110a may request that the auditee 110b present a proof showing ownership, access to or possession of the private key of the public key-private key pair. In such embodiments, the auditee 110b may generate a proof that proves to the auditor 110a, when verified, that the auditee 110b is an owner of the account without having to necessarily reveal the private key to either the auditor 110a, other participants of the ZKP-enabled DLN 100 or the public at large. For example, in some implementations, the auditee 110b may generate a ZKP (e.g., zk-SNARK proof) 114 of ownership of the account on the ZKP-enabled DLN 100. In some embodiments, the auditor 110a may not accept a ZKP from the auditee 110b that is generated using setup other than a trusted setup (e.g., a ZKP generating system setup by the auditor 110a or another entity entrusted by the auditor 110a). For example, the auditor 110a may not accept a ZKP from the auditee 110b unless the ZKP is generated in accordance with the following procedure.

In some embodiments, the ZKP 114 provided by the auditee 110b to prove to the auditor 110a that the auditee 110b owns an account on the ZKP-enabled DLN 100 may be generated as follows. Initially, a function C that is configured to take two inputs and return Boolean results (e.g., "true" or "false" outputs) may be generated. In some implementations, the function C may have the property where C(x, w) has a "true" output when x is the public key and w is the private key of the asymmetric key pair (and has a "false" output otherwise). The C function may be generated either by the auditor 110a (e.g., using the computing node 102a), the auditee 110b (e.g., using the computing node 102b) and/or any other entity. In some instances, the C function may be available to and/or validated by both the auditor 110a and the auditee 110b. In some instances, the C function may be generated on the ZKP-enabled DLN 100. In some embodiments, the C function may be generated on a computing node (not shown) that is not part of the ZKP-enabled DLN 100 (e.g., a computing node that is off-chain).

In some embodiments, after the generation of the C function, a key generator algorithm G (e.g., a zk-SNARK key generator algorithm) may be used to generate a proving key $P_k$ and/or a verification key $V_k$ that can be used to generate the ZKP. For example, the key generator algorithm G may be such that when a parameter L and the function C are plugged into the key generator algorithm G, the results are the proving key $P_k$ and/or the verification key $V_k$, as follows: $(P_k, V_k)=G(L, C)$. In some implementations, the proving key $P_k$ and/or the verification key $V_k$ may be generated, using a computing device, by a third party that is different from the auditor 110a and/or the auditee 110b. For example, the third party may be a trusted entity that is trusted by the auditor 110a and/or the auditee 110b to not disclose the parameter L publicly or at least to the auditee 110b.

In some instances, the computing device used to generate the proving key $P_k$ and/or the verification key $V_k$ may be different from the computing node 102a of the auditor 110a and the computing node 102b of the auditee 110b. In some implementations, the proving key $P_k$ and/or a verification key $V_k$ may be generated by the auditor 110a using the computing node 102a. In some implementations, the proving key $P_k$ and/or a verification key $V_k$ may not be generated by the auditee 110b (e.g., using the computing node 102b). In some instances, the proving key $P_k$ and/or the verification key $V_k$ may be generated on the ZKP-enabled DLN 100. In yet other instances, the proving key $P_k$ and/or the verification key $V_k$ may be generated on a computing node (not shown) that is not part of the ZKP-enabled DLN 100 (e.g., a computing node that is off-chain). In some implementations, the parameter L may be destroyed after the generation of the ZKP 114 without having been made available to the auditee 110b (i.e., to the generator of the ZKP).

In some embodiments, after the generation of the proving key $P_k$ and/or a verification key $V_k$, the proving key $P_k$ may be provided to the auditee 110b at the computing node 102b and the verification key $V_k$ may be provided to the auditor 110a at the computing node 102a. In some embodiments, the auditee 110b may use the proving key $P_k$, the public key x and/or the private key w of the auditee 110b on the ZKP-enabled DLN 100 to generate the ZKP 114 that the auditee 110b owns the account (e.g., the auditee 110b knows or owns the private key w). For example, the auditee 110b, using the computing node 102b, may apply an algorithm P on the proving key $P_k$, the public key x and/or the private key w to return the ZKP 114 $prf=P(P_k, x, w)$. In some implementations, the auditee 110b, using the computing node 102b, may generate the ZKP 114 prf on the ZKP-enabled DLN 100. In some implementations, the auditee 110b may use a computing node (not shown) that is not part of the ZKP-enabled DLN 100 (e.g., a computing node that is off-chain) to generate the ZKP 114 prf.

In some embodiments, the auditee 110b, via the computing node 102b, may make the ZKP 114 prf available to the auditor 110a to facilitate the audit process to determine whether the auditee 110b owns the account identified by the public key x. For example, the auditee 110b, using the computing node 102b, may provide the ZKP 114 prf to the auditor 110a at the computing node 102a, and/or may provide the ZKP 114 prf to the smart contract executing on the ZKP-enabled DLN 100. For instance, the auditee 110b, via the computing node 102b, may provide the ZKP 114 prf to the auditor 110a at the computing node 102a in response to a request 112 from the auditor 110a. In some implementations, the auditee 110b, using the computing node 102b, may provide the ZKP 114 prf to the smart contract on the ZKP-enabled DLN 100 for later use by the auditor 110a when the auditor 110a is ready to audit the ownership of the account.

In some embodiments, after the ZKP 114 prf is made available to the auditor 110a (e.g., via the computing node 102a) and/or provided to the smart contract, the auditor 110a may proceed with the verification of the ZKP 114 prf to determine if in fact the auditee 110b owns the account on the ZKP-enabled DLN 100. For example, the auditor 110a, using the computing node 102a, may proceed with applying an algorithm V on the verification key $V_k$, the public key x and/or the ZKP 114 prf (i.e., $V(V_k, x, pro)$ that returns "true" only when the ZKP 114 prf is a valid proof. In other words, $V(V_k, x, prf)$="true" only when the private key w is the private key of the asymmetric key pair of the account the ownership of which is being audited (and the account identified by the public key of the public key-private key pair). In some implementations, the auditor 110a may apply, using the computing node 102a, the algorithm V on the verification key $V_k$, the public key x and/or the ZKP 114 prf on the ZKP-enabled DLN 100. and/or off of the ZKP-enabled DLN 100. In some implementations, the auditor 110a may use a computing node (not shown) that is not part of the ZKP-enabled DLN 100 (e.g., a computing node that is off-chain) to apply the algorithm V on the verification key $V_k$, the public key x and/or the ZKP 114 prf on the ZKP-enabled DLN 100.

In some implementations, when the auditor 110a applies the algorithm V (e.g., using the computing node 102a or an external computing node (not shown)) and a "true" result is returned, the auditor 110a may consider the result as an evidence or confirmation that the auditee 110b has access to the private key w and owns the account on the ZKP-enabled DLN 100 that is being audited. In some embodiments, after the auditee 110b makes the ZKP 114 prf available to the auditor 110a (e.g., by providing, via the computing node 102b, the ZKP 114 prf to the auditor 110a and/or the smart contract), there may not be any further interaction between the auditee 110b and the auditor 110a and/or between the computing node 102b and the computing node 102a. In other words, the audit process of the account may not be interactive between the auditor 110a and the auditee 110b after the ZKP 114 prf is generated and made available by the auditee 110b. For example, the auditor 110a or the computing node 102a may not provide a cryptographic challenge to the auditee 110b or to the computing node 102b, and/or the auditee 110b or the computing node 102b may not initiate a test transaction (e.g., as a demonstration that the auditee 110b owns the account) as part of the audit process (e.g., after the ZKP 114 prf is made available by the auditee 110b (e.g., using the computing node 102b) or after the auditee 110b, at the computing node 102b, receives the request 112 from the auditor 110a). In some implementations, the auditee 110b may not reveal the private key of the account to the auditor 110 during the audit process (e.g., after the ZKP 114 prf is made available by the auditee 110b or after the auditee 110b receives the request 112 from the computing node 102a of the auditor 110a). For example, the auditor 110a may not have access or knowledge of the private key of the account at least until after the verification of the ZKP 114 prf (e.g., the application of the algorithm V returning "true").

In some embodiments, the verification of the ZKP 114 prf may be performed without any identifying information of the auditor 110a, the auditee 110b, the account and/or contents of the account being revealed or made public as a result of the audit process or the verification process.

Figure 2:
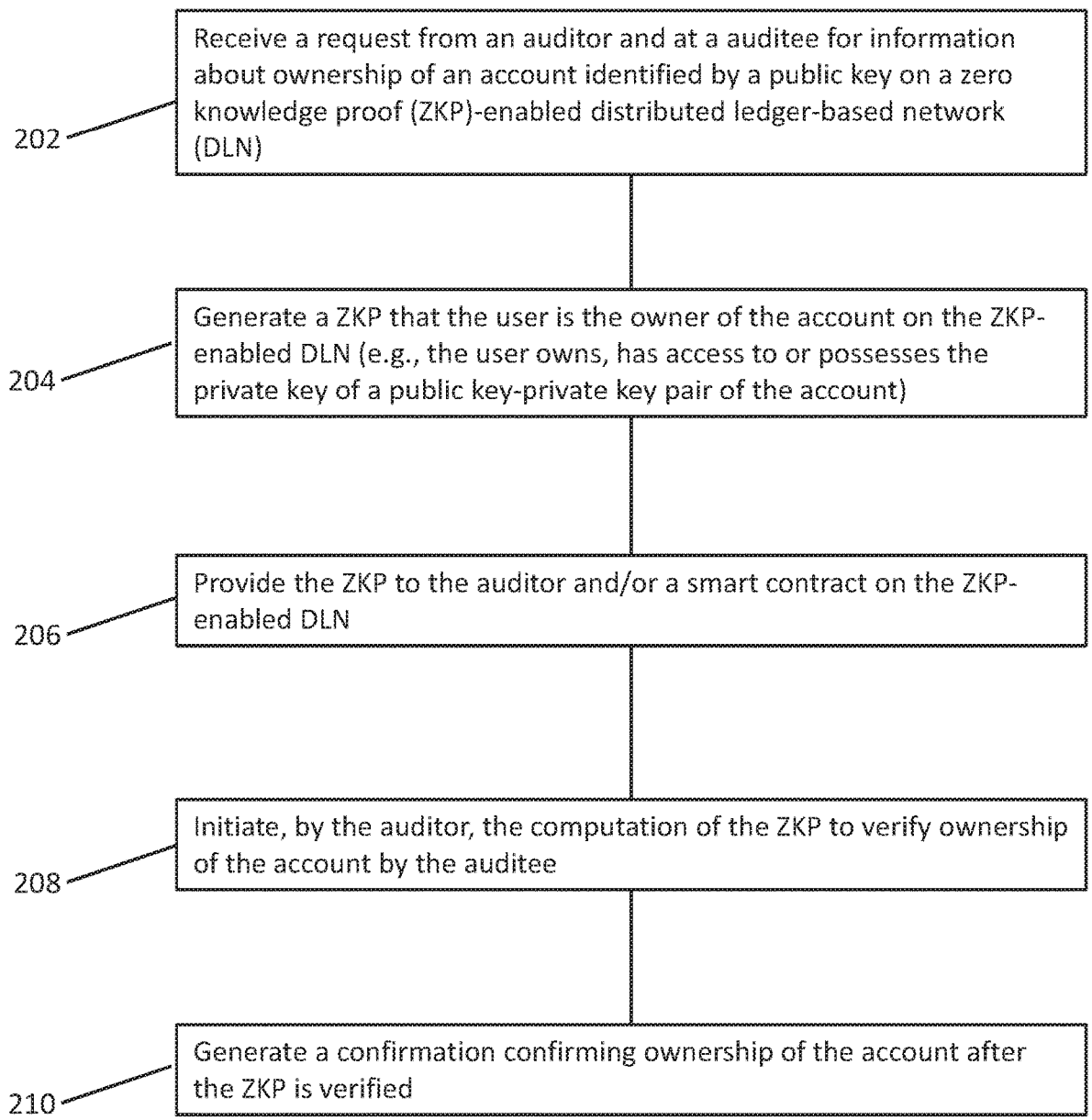
FIG. 2 shows a flow chart illustrating the generation and use of a zero-knowledge proof in auditing the ownership of an account on a distributed ledger-based network, according to some embodiment.

FIG. 2 shows a flow chart illustrating the generation and use of a ZKP in auditing the ownership of an account on a ZKP-enabled DLN, according to some embodiments. In some embodiments, a first participant 110a (hereinafter referred as an "auditor") of the ZKP-enabled DLN 100 may be an auditor retained for determining whether a second participant 110b (e.g., a client, hereinafter referred as an "auditee") owns an account on the ZKP-enabled DLN 100 that the auditee claims to do so. For example, the auditee 110b may claim that an account on the ZKP-enabled DLN 100 that is identified by the public key of an asymmetric key pair of the account belongs to the auditee, and an auditor 110a may be tasked to determine whether the auditee 110b in fact owns the account. For instance, the auditor 110a may be tasked to determine if the auditee 110b owns, has access to or possesses the private key of the asymmetric key pair of the account. In some implementations, ownership or possession of the private key may be deemed as a proof of ownership of the account. In some cases, the account may be identified by a blockchain network public address which may be obtained by hashing, amongst other things, the public key.

In some embodiments, in response to a request at 202 by an auditor 110a, the auditee 110b may use the computing device 102a to generate, at 204, a ZKP that the auditee 110b owns the account on the ZKP-enabled DLN 100. In some embodiments, the auditee 110b may use the computing device 102b to generate the ZKP without necessarily having been requested by the auditor 110a. For example, after an auditor-auditee relationship is established between the auditor 110a and the auditee 110b, the auditee may use the computing device 102b to generate the ZKP for later use by the auditor 110a. In some embodiments, the ZKP may include the proof that the auditee 110b owns, has access to or possesses the private key of an asymmetric key pair of an account on the ZKP-enabled DLN 100 identified by the public key of the asymmetric key pair.

In some embodiments, at 206, the auditee 110b may use the computing device 102b to provide the ZKP to the auditor 110a and/or the smart contract of the ZKP-enabled DLN 100. In some implementations, the auditee 110b may provide or publish the ZKP to the smart contract anonymously. After the ZKP is provided to the auditor 110a and/or the smart contract, in some embodiments, the auditor 110a may proceed with having the smart contract verify the ZKP to determine whether the auditee 110b in fact owns the account. For example, the auditor 110a may cause the smart contract to start the computation of the ZKP to determine the validity of the ZKP. In some implementations, the smart contract may be programmed to initiate (e.g., automatically) the computation of the ZKP based on a pre-determined condition so that the auditor 110a can use the results of the computation or verification of the ZKP when auditing the auditee's 102b ownership of the account. For example, the smart contract may compute the ZKP at pre-determined dates and times (e.g., the date and time information obtained by the smart contract from an oracle, as discussed above).

In some embodiments, at 208, the smart contract of the ZKP-enabled DLN 100 may verify the ZKP (e.g., verify that the ZKP is valid) and the auditor 110a may use the computing device 102a to generate a confirmation that the auditee 110b is an owner of the account. In some implementations, the verification of the ZKP and/or the generation of the confirmation may occur without any further interaction between the auditor 110a and the auditee 110b after the auditee 110b provided the ZKP to the auditor 110a (e.g., using the computing device 102b) and/or the smart contract. For example, the ZKP may be verified and/or the confirmation may be generated without the auditee 110b or the auditee's computing device 102b responding to a cryptographic challenge (e.g., from the auditor 110a) or being engaged in a test transaction (e.g., with the auditor 110a). In some implementations, a test transaction can be a transaction originating from the account being audited and supposedly undertaken by the auditee 110b as a demonstration of the auditee's 110b ownership of the account.

In some implementations, the verification of the ZKP and/or the generation of the confirmation may occur without any identifying information of the auditor 110a, the auditee 110b, the account and/or contents of the account being revealed to the other participants of the ZKP-enabled DLN 100 or to the public at large as a result of the audit process. For example, the verification of the ZKP and/or the generation of the confirmation may occur without the private key of the account being revealed to the auditor 110a and/or the to the other participants of the ZKP-enabled DLN 100.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
sending, from a device of a first user to a device of a second user, the device of the first user and the device of the second user being part of a common zero knowledge proof (ZKP)-enabled distributed ledge-based network (DLN), a request for information about an access the second user has to an account on the ZKP-enabled DLN, the account having sent and/or received at least one token representing a physical off-the-DLN asset on the ZKP-enabled DLN before sending the request; and
generating, by the device of the first user and in response to the request, a confirmation confirming the second user has access to the account after a self-executing code segment on the ZKP-enabled DLN verifies a ZKP that the second user has access to the account,
the ZKP generated and submitted to the self-executing code segment by the second user on the ZKP-enabled DLN using the device of the second user.

2. The method of claim 1, wherein the ZKP that the second user has access to the account includes the ZKP that the second user has access to a private key of the account.

3. The method of claim 1, wherein the ZKP that the second user has access to the account includes the ZKP that the second user has access to a private key of the account, the verification of the ZKP including the verification of the ZKP to verify the second user has access to the private key of the account.

4. The method of claim 1, wherein the confirmation is generated without a private key of the account being revealed to the first user.

5. The method of claim 1, wherein the confirmation is generated without any identifying information about the second user being revealed publicly after the request is sent.

6. The method of claim 1, wherein the confirmation is generated without any identifying information about the account and/or a content of the account being revealed publicly after the request is sent.

7. The method of claim 1, wherein the confirmation is generated without the second user responding to a cryptographic challenge from the first user after the request is sent.

8. The method of claim 1, wherein the confirmation is generated without the second user being party to a test transaction to prove ownership of the account after the request is sent.

9. A method, comprising:
receiving, from a device of a first user and at a device of a second user, the device of the first user and the device of the second user being part of a common zero-knowledge proof (ZKP)-enabled distributed ledger-based network (DLN), a request for information about an access the second user has to an account on the ZKP-enabled DLN, the account having sent and/or received at least one token representing a physical off-the-DLN asset on the ZKP-enabled DLN before receiving the request;
generating, in response to the request and using the device of the second user, a zero-knowledge proof (ZKP) that the second user has access to the account; and
providing the ZKP to a self-executing code segment on the ZKP-enabled DLN,
the ZKP configured to prove, upon verification by the self-executing code segment, that the second user has access to the account.

10. The method of claim 9, wherein the ZKP that the second user has access to the account includes the ZKP that the second user has access to a private key of the account.

11. The method of claim 9, wherein the ZKP is verified without a private key of the account being revealed to the first user.

12. The method of claim 9, wherein the ZKP is verified without any identifying information about the second user being publicly revealed after the request is received.

13. The method of claim 9, wherein the ZKP is verified without any identifying information about the account and/or a content of the account being revealed publicly after the request is received.

14. The method of claim 9, wherein the ZKP is verified without the second user responding to a cryptographic challenge from the first user after the request is received.

15. The method of claim 9, wherein the ZKP is verified without the second user being party to a test transaction to prove ownership of the account after the request is received.

16. A processor-readable non-transitory medium storing processor-issuable instructions configured to:
- receive, from a device of a first user and at a device of a second user, the device of the first user and the device of the second user being part of a common zero-knowledge proof (ZKP)-enabled distributed ledger-based network (DLN), a request for information about an access the second user has to an account on the ZKP-enabled DLN, the account having sent and/or received at least one token representing a physical off-the-DLN asset on the ZKP-enabled DLN before receiving the request;
- generate, in response to the request and using the device of the second user, a ZKP that the second user has access to the account; and
- provide the ZKP to a self-executing code segment on the ZKP-enabled DLN,
  - the ZKP configured to prove, upon verification by self-executing code segment, that the second user has access to the account.

17. The processor-readable non-transitory medium of claim 16, wherein the ZKP that the second user has access to the account includes the ZKP that the second user has access to a private key of the account.

18. The processor-readable non-transitory medium of claim 16, wherein the ZKP is verified without a private key of the account being revealed to the first user.

19. The processor-readable non-transitory medium of claim 16, wherein the ZKP is verified without any identifying information about the second user being publicly revealed after the request is received.

20. The processor-readable non-transitory medium of claim 16, wherein the ZKP is verified without any identifying information about the account and/or a content of the account being revealed publicly after the request is received.

21. The processor-readable non-transitory medium of claim 16, wherein the ZKP is verified without the second user responding to a cryptographic challenge from the first user after the request is received.

22. The processor-readable non-transitory medium of claim 16, wherein the ZKP is verified without the second user being party to a test transaction to prove ownership of the account after the request is received.

23. A method, comprising:
- receiving, at a device of a first user and from a device of a second user, the device of the first user and the device of the second user part of a common zero-knowledge proof (ZKP)-enabled distributed ledger-based network (DLN), a request to determine whether or not the second user has access to an account on the ZKP-enabled DLN, the account identified on the ZKP-enabled DLN by a public key of an asymmetric key pair and having sent and/or received at least one token representing a physical off-the-DLN asset on the ZKP-enabled DLN before receiving the request;
- retrieving, by the device of the first user and in response to the request and from the ZKP-enabled DLN, a result of a verification of a ZKP computed by a self-executing code segment on the ZKP-enabled DLN,
  - the ZKP (i) generated and provided to the self-executing code segment by a device of the second user and (ii) including the ZKP that the second user has access to a private key of the asymmetric key pair; and
- generating, based on the retrieved result, a confirmation determining whether or not the second user has access to the account.

24. The method of claim 23, wherein the confirmation is generated without the private key being revealed to the first user.

25. The method of claim 23, wherein the confirmation is generated without any identifying information about the second user being publicly revealed after the request is received.

26. The method of claim 23, wherein the confirmation is generated without any identifying information about the account and/or a content of the account being revealed publicly after the request is received.

27. The method of claim 23, wherein the confirmation is generated without the second user responding to a cryptographic challenge from the first user after the request is received.

28. The method of claim 23, wherein the confirmation is generated without the second user being party to a test transaction to prove ownership of the account after the request is received.

* * * * *

UNITED STATES PATENT AND TRADEMARK OFFICE
CERTIFICATE OF CORRECTION

| | |
|---|---|
| PATENT NO. | : 11,943,358 B2 |
| APPLICATION NO. | : 16/383845 |
| DATED | : March 26, 2024 |
| INVENTOR(S) | : Matthew James Baker |

It is certified that error appears in the above-identified patent and that said Letters Patent is hereby corrected as shown below:

In the Specification

Column 5, Line 51: "sources such as the interne (via a web API, for example)," should read
-- sources such as the internet (via a web API, for example), --

Column 8, Line 47: "and/or the ZKP 114 prf (i.e., $V(V_k, x, pro)$ that returns "true"" should read -- and/or the ZKP 114 prf (i.e., $V(V_k, x, prf)$ that returns "true" --

Signed and Sealed this
Fourteenth Day of May, 2024

Katherine Kelly Vidal
*Director of the United States Patent and Trademark Office*